United States Patent
Persaud-Deolall et al.

(10) Patent No.: US 7,996,893 B2
(45) Date of Patent: Aug. 9, 2011

(54) DETERMINING ROLES FOR AUTOMATED TASKS IN A ROLE-BASED ACCESS CONTROL ENVIRONMENT

(75) Inventors: Shiva Persaud-Deolall, Austin, TX (US); Xinya Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1093 days.

(21) Appl. No.: 11/760,903

(22) Filed: Jun. 11, 2007

(65) Prior Publication Data

US 2008/0307505 A1 Dec. 11, 2008

(51) Int. Cl.
*G06F 13/14* (2006.01)
(52) U.S. Cl. .............. 726/21; 726/13; 726/27; 713/181; 713/183; 705/51
(58) Field of Classification Search ............... 705/51; 713/181, 183; 726/13, 21, 27
See application file for complete search history.

(56) References Cited

U.S. PATENT DOCUMENTS

| | | | |
|---|---|---|---|
| 7,712,670 B2 * | 5/2010 | Sauerwein et al. | 235/472.02 |
| 2002/0026592 A1 * | 2/2002 | Gavrila et al. | 713/201 |

OTHER PUBLICATIONS

U.S. Appl. No. 11/565,249, filed Nov. 30, 2006, Desai et al.

* cited by examiner

*Primary Examiner* — Michael Pyzocha
*Assistant Examiner* — Paul Callahan
(74) *Attorney, Agent, or Firm* — Yee & Associates, P.C.; Justin M. Dillon

(57) ABSTRACT

A computer implemented method, apparatus, and computer program product for performing an automated task in a role-based access control environment. A set of roles is assigned to a user to form assigned roles, wherein the role-based access control environment allows the user to assume a subset of the assigned roles at a given time. Responsive to receiving a request to execute an automated task, an identity of the user creating the automated task is identified. Responsive to determining that the user creating the automated task is not logged in, a set of session roles are identified based on the identity of the user. A session is created for the automated task. The automated task is performed in the session using the set of session roles.

17 Claims, 4 Drawing Sheets

DETERMINING ROLES FOR AUTOMATED TASKS IN A ROLE-BASED ACCESS CONTROL ENVIRONMENT

This invention was made with United States Government support under Agreement No. HR0011-07-9-0002 awarded by Defense Advanced Research Projects Agency (DARPA). The government has certain rights in this invention.

BACKGROUND OF THE INVENTION

1. Field of the Invention

The present invention relates generally to data processing systems and in particular to role-based access control. Still more particularly, the present invention relates to a computer implemented method, apparatus, and computer program code for determining roles for automated tasks in a role-based access control environment.

2. Description of the Related Art

In a computer system, an important part of security is controlling user access to computer resources. One common method of controlling user access to computer resources is role-based access control (RBAC), in which each user is assigned one or more roles. Associated with each role are specific resources which the role can access. For example, a sales role may be able to enter and modify orders in an order database, while a fulfillment role may be able to look at orders in the order database and inventory in an inventory database.

In a role-based access control environment, a system administrator defines a set of roles and, for each role, associates a set of access privileges to specific computer resources. A role-based access control environment may restrict the number of roles a user may assume at any given time. For example, a user may be assigned twenty roles, but may only be able to assume five roles at a given time. When the user interacts with the computer system, the user is logged in and can, therefore, specify which subset of roles the user is assuming at any given time. However, the user may not be logged in when the computer system executes a user-created automated task.

An automated task is a set of activities performed on behalf of the user without any further input from the user. The set of activities is performed as if the user was performing the activities, though the user may not be logged in. For example, a user may automate an application to perform a task when a specific event occurs. When the specified event occurs, the application performs the specified task as if the user was performing the task, but without any further interaction with the user. One of the advantages of using automated tasks is that the user need not be logged in when the automated task is performed.

When a user logs in, a login session is created for that user and the user specifies which roles the user is assuming in that session. In a role-based access control environment, any automated tasks the user executes during that session use the roles which the user has assumed during the session. However, if the user is not logged in when an automated task is executed, there is no way of determining which session roles to use when executing the automated task.

SUMMARY OF THE INVENTION

The illustrative embodiments described herein provide a computer implemented method, apparatus, and computer program product for performing an automated task in a role-based access control environment. A set of roles is assigned to a user to form assigned roles, wherein the role-based access control environment allows the user to assume a subset of the assigned roles at a given time. Responsive to receiving a request to execute an automated task, an identity of the user creating the automated task is identified. Responsive to determining that the user creating the automated task is not logged in, a set of session roles are identified based on the identity of the user. A session is created for the automated task. The automated task is performed in the session using the set of session roles.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
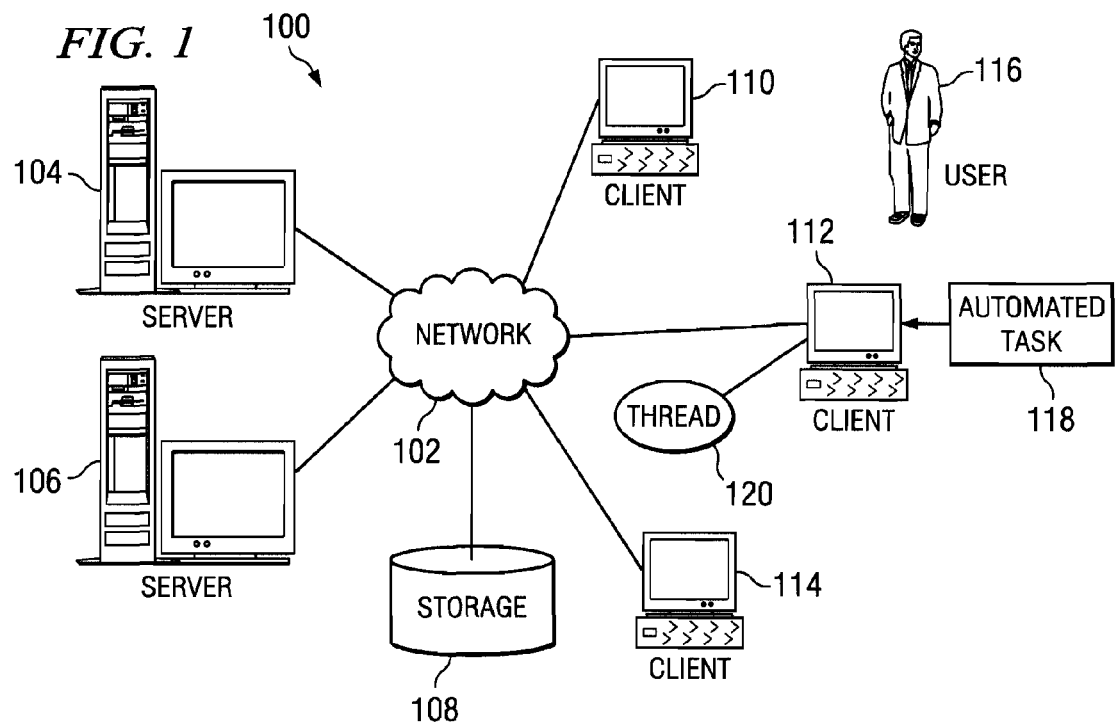
FIG. 1 depicts a pictorial representation of a network of data processing systems in accordance with an illustrative embodiment.
Figure 2:
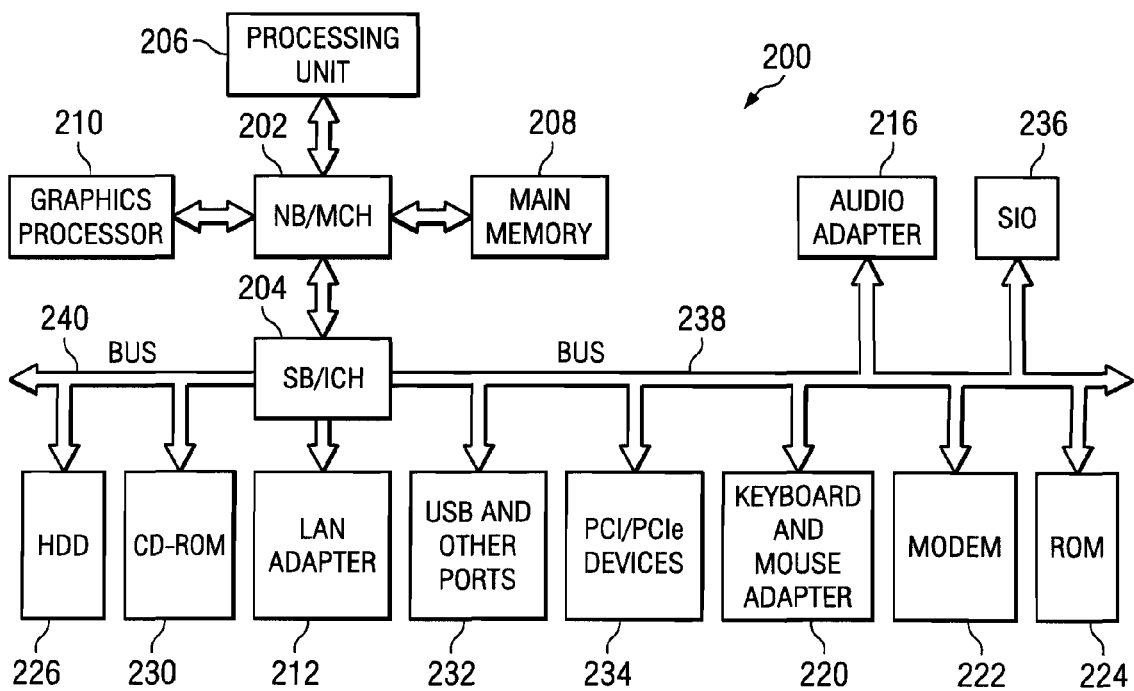
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Servers 104-106 and clients 110-114 may contain software components for a role-based access control environment. For example, servers 104-106, and clients 110-114 may contain processes and data used to manage roles for users who access servers 104-106 on network 102 using clients 110-114.

A user, such as user 116, logs on to a client, such as client 110, to perform various tasks. User 116 may create automated task 118 on client 110 in order to execute a set of activities contained in automated task 118. The set of activities may be one or more activities, such as commands. Automated task 118 is executed when a user-specified event, such as a specific date and time, occurs. Automated task 118 may be executed when user 116 is not logged in.

An operating system thread, such as thread 120, waits for the user-specified event to occur. Thread 120 is a software process running on a client, such as client 112. When the user-specified event occurs, thread 120 performs automated task 118 as if user 116 was logged in and executing the activities on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A common method of controlling user access to computer resources is through the use of role-based access control (RBAC) software. The role-based access control software creates a role-based access control environment. In a role-based access control environment, when a user creates an automated task, the automated task is performed by an operating system thread, such as thread 120 in FIG. 1, on behalf of the user, without any interaction with the user. The automated task is a set of activities performed on behalf of the user. In these examples, a set of activities is one or more activities, which a user would normally perform. For example, the automated task may be a command, such as file transfer protocol (FTP), an application program, such as a program for sending a fax, or a script file containing multiple commands.

The operating system thread performs the automated task when a user-specified event occurs. For example, if the specified event is a particular time, the automated task may be performed every day at the specified time, such as backing up a set of files. Another example of a specified event is a log in for a specific user. If a supervisor wants to be alerted each time a new employee logs in, the user can create an automated task to send an email or instant message to the supervisor when the specified user logs into the system. This alert allows the supervisor to monitor the activities of the new employee.

Each time a user logs in to a computer using the operating system, the operating system creates a login session for the user. After logging in, the user specifies the roles which the user wishes to use for the session. These roles are called the session roles. If the user is logged in when the operating system thread performs the automated task, the roles currently specified by the user in the login session are used to perform the automated task. If the user is not logged in, there is no way for the operating system thread to determine which of the user's roles to use when performing the automated task. Therefore, the illustrative embodiments recognize a need for determining which of the user's roles to assign to an automated task when the user is not logged in when the automated task is performed.

The illustrative embodiments described herein provide a computer implemented method, apparatus, and computer program product for performing an automated task in a role-based access control environment. A set of roles is assigned to a user to form assigned roles, wherein the role-based access control environment allows the user to assume a subset of the assigned roles at a given time. Responsive to receiving a request to execute an automated task, an identity of the user creating the automated task is identified. Responsive to determining that the user creating the automated task is not logged in, a set of session roles are identified based on the identity of the user. A session is created for the automated task. The automated task is performed in the session using the set of session roles.

Figure 3:
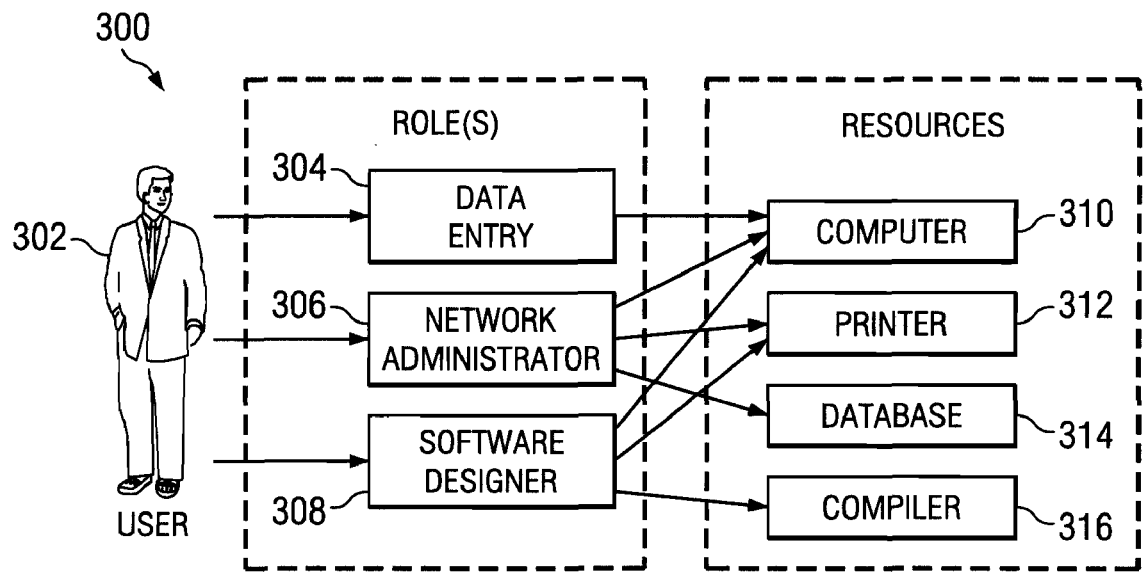
FIG. 3 is a diagram of the roles and resources accessible to a user in accordance with an illustrative embodiment.

FIG. 3 is a diagram of the roles and resources accessible to a user in accordance with an illustrative embodiment. In FIG. 3, user 302 has three roles defined, data entry 304, network administrator 306, and software designer 308. The data entry 304 role has access to resource computer 310. The network administrator 306 role has access to resources computer 310, printer 312, and database 314. The software designer 308 role has access to resources computer 310, printer 312, and compiler 316.

In this example, all three roles are assigned to user 302. In the depicted example, the role-based access control environment only allows the user to assume one role at a time. In this example user 302 accesses a network, such as network 100 in FIG. 1, and uses a distributed compiler to compile software programs. The distributed compiler uses the computing power from clients 110, 112, and 114 in FIG. 1 when compiling.

Assume that user 302 has created a large software program and wants to compile the program at midnight when there are fewer users on network 100. User 302 creates an automated task, such as automated task 118 in FIG. 1. User 302 specifies that the automated task is to be performed at midnight each night. When the automated task is performed at midnight, the compiler compiles the program as if the user was logged in and entering the compile command on client 110 in FIG. 1.

If user 302 is not logged in when automated task 118 is performed, the computer system determines which one of the three roles of user 302 should be used when performing the automated task. When an automated task is performed, the roles assigned to the automated task are called session roles, because the roles are valid for the session in which the automated task is performed. The session roles are a set of roles, wherein a set of roles is one or more roles.

One approach to determining the session roles for an automated task when the user is not logged in is to use a set of default roles. The set of default roles are a set of roles created by a system administrator. The set of default roles are created before the user created the automated task, so the default roles are also known as pre-defined default roles. The system administrator creates the set of default roles, and assigns the set of default roles to a user. If the user creates an automated task, and the user is not logged in when the automated task is performed, the default roles are used to perform the automated task.

Another approach to determining the session roles for an automated task, when the user is not logged in, is to use the most frequently assumed roles of the user. In this approach, the history of each login session the user has created is used. All the roles the user has historically used are ranked based on how frequently the user assumes the roles. The most frequently assumed roles are then chosen as the session roles for the automated task.

A third approach to determining the session roles for an automated task, when the user is not logged in, is to use a set of parent roles. In a hierarchical role-based access control environment, roles may be organized in a hierarchical structure. In the hierarchical role structure, related roles are grouped together, and a parent role is assigned to the related roles. The parent role has the capabilities of the roles of all the related roles below the parent role. The roles below the parent role are called child roles. Each child role has a subset of the capabilities of the parent role. The parent role is also called a super-role because a user assuming the parent role can perform all the tasks a user assuming any of the child roles can perform. If the roles are organized hierarchically, a set of parent roles may be determined for the user's current roles, and the automated task may be performed in a session using the set of parent roles.

Figure 4:
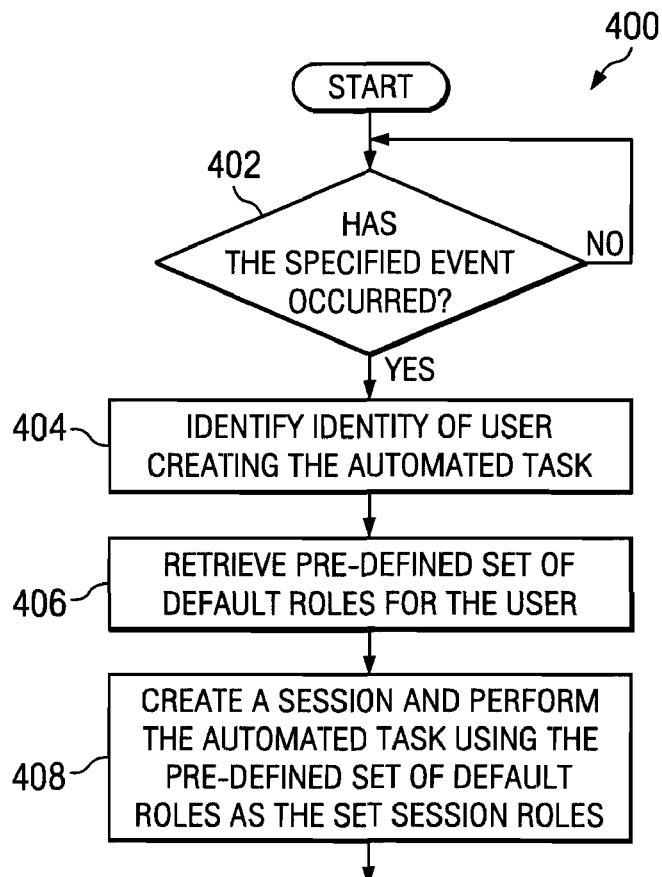
FIG. 4 is a flowchart for determining the roles to assign an automated task using default roles in accordance with an illustrative embodiment.
Figure 5:
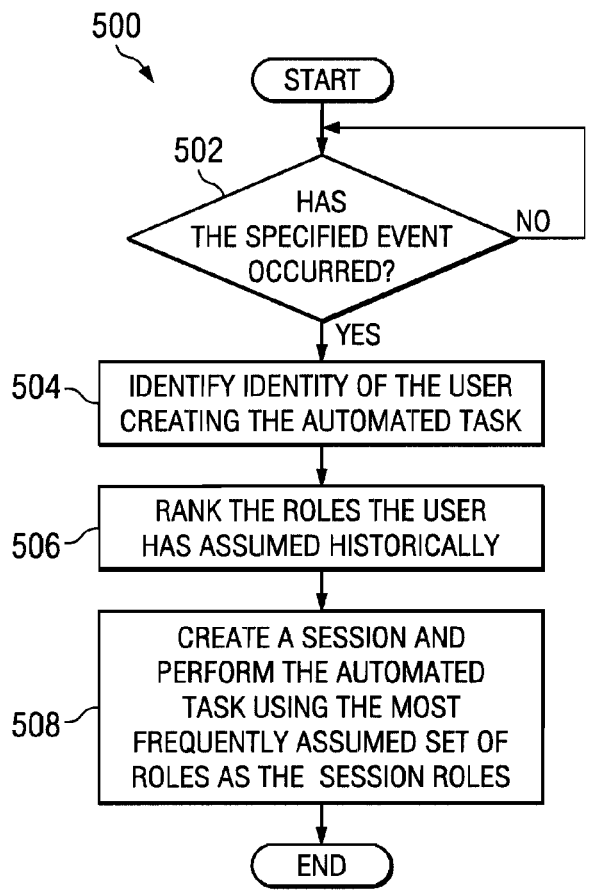
FIG. 5 is a flowchart for determining the roles to assign an automated task using an analysis of the user's historical usage of roles in accordance with an illustrative embodiment.
Figure 6:
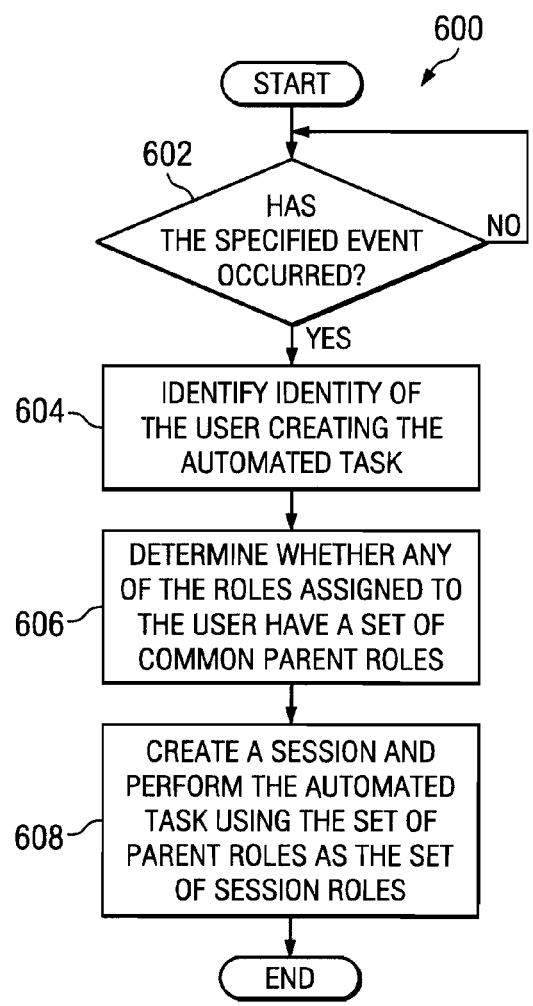
FIG. 6 is a flowchart for determining the roles when performing an automated task using a set of common parent roles in accordance with an illustrative embodiment.

FIGS. 4-6 illustrate three different techniques for determining the roles to assign an automated task. FIG. 4 is a flowchart for determining the set of roles when performing an automated task using default roles in accordance with an illustrative embodiment. The process in FIG. 4 is executed by software, such as thread 120 in FIG. 1.

FIG. 4 assumes that a user has created an automated task, and has specified the event which causes the automated task to be performed. FIG. 4 also assumes that a system administrator has created a set of default roles, assigned them to a user, and specified that a subset of those roles is the set of default roles. If the role-based access control environment restricts the maximum number of roles a user may be assigned at a given time, the system administrator may specify the same number of default roles as the maximum number of roles as the role-based access control allows a user to have at a time. For example, if a user has been assigned twenty roles, but role-based access control only allows the user to assume five roles at any given time, then the system administrator may designate five roles as default roles.

The process begins by determining whether the specified event has occurred (step 402). If the answer is "no", the process waits for the specified event to occur in step 402. If the answer is "yes" and the specified event has occurred, then the process identifies the identity of the user creating the automated task (step 404). Based on the identity of the user, the process retrieves the set of default roles specified for the user (step 406). The process creates a session for the automated task, performs the automated task using the set of default roles as the set of session roles (step 408), and the process ends. In this example, the set of default roles is used as the session roles for the automated task.

FIG. 5 is a flowchart for determining the roles when performing an automated task using an analysis of the user's historical usage of roles in accordance with an illustrative embodiment. The process in FIG. 5 is executed by software, such as thread 120 in FIG. 1. FIG. 5 assumes that a user has created an automated task, such as automated task 118 in FIG. 1, and has specified an event which causes the automated task to be performed. FIG. 5 also assumes that the software system keeps track of the number of times each user assumes a role.

The process begins by determining whether the specified event has occurred (step 502). If the answer is "no", the process waits for the specified event to occur in step 502. If the answer is "yes" and the specified event has occurred, then the process identifies the identity of the user creating the automated task (step 504). Based on the identity of the user, the roles the user assumed in previous sessions are ranked based on frequency, and the most frequently assumed set of roles are chosen as the set of session roles (step 506). The process creates a session and performs the automated task using the most frequently assumed set of roles as the set of session roles (step 508), and the process ends.

For example, if a user has been assigned three roles, but the role-based access control environment only allows the user to assume two roles at any given time, then the process chooses the most frequently assumed roles based on the user's history. Assume a user is assigned three roles; an order entry role, an order modification role, and an order deleting role. Assume that the role-based access control environment keeps track of how many times the user has assumed each assigned role for the past one year, and that in the past year, the user has assumed the order entry role one hundred times, the order modification role ninety times, and the order deletion role sixty times. The process then chooses the order entry role and the order modification role as the historically most frequently assumed roles, and chooses these two roles as the set of session roles.

FIG. 6 is a flowchart for determining the roles when performing an automated task using a set of common parent roles. The process in FIG. 6 is executed by software, such as thread 120 in FIG. 1. FIG. 6 assumes that a user has created an automated task, and has specified an event which causes the automated task to be performed.

In addition, FIG. 6 assumes that the role-based access control environment uses a hierarchical role structure in which two or more sub-roles, called child roles, may have a common parent role. A common parent role is also known as a super-role, because the parent role has the combined capabilities of all the child roles hierarchically below the parent role. For example, one role may be allowed to enter an order, a second role allowed to modify an entry, and a third role allowed to delete an entry. In a hierarchical role structure, all three roles may have a common parent role, such as, for example an order access role. A user assigned the common parent role, in this example the order access role, can perform all the tasks the child roles can perform.

The process begins by determining whether the specified event has occurred (step 602). If the answer is "no", the process waits for the specified event to occur in step 602. If the answer is "yes" and the specified event has occurred, then the process identifies the identity of the user creating the automated task (step 604). Based on the roles assigned to the user, the process determines whether two or more of the roles assigned to the user have a common set of parent roles (step 606). The process creates a session for performing the automated task, the common set of parent roles is used as the set of session roles to perform the automated task (step 608) instead of the child roles, and the process ends. The parent roles are used instead of the child roles for the session in order to keep the assigned roles for the session at or below the maximum roles which the user can assume at a time.

The system administrator may specify which of the above techniques are used for determining the set of session roles to use when performing an automated task. For example, in one embodiment, the system administrator may specify that the process use the default roles of the user when performing the automated task. In another embodiment, the system administrator may specify that the process use the roles the user has historically most frequently assumed when the process performs the automated task. Alternately, in another embodiment, the system administrator may specify that a set of common parent roles, common to the user's roles, be used when performing the automated task. The system administrator may also specify that a combination of the three techniques be used. For example, the system administrator may specify that the process first look to see if default roles have been defined, and if default roles are not defined, then to look at the historically most frequently assumed roles or common parent roles.

Figure 7:
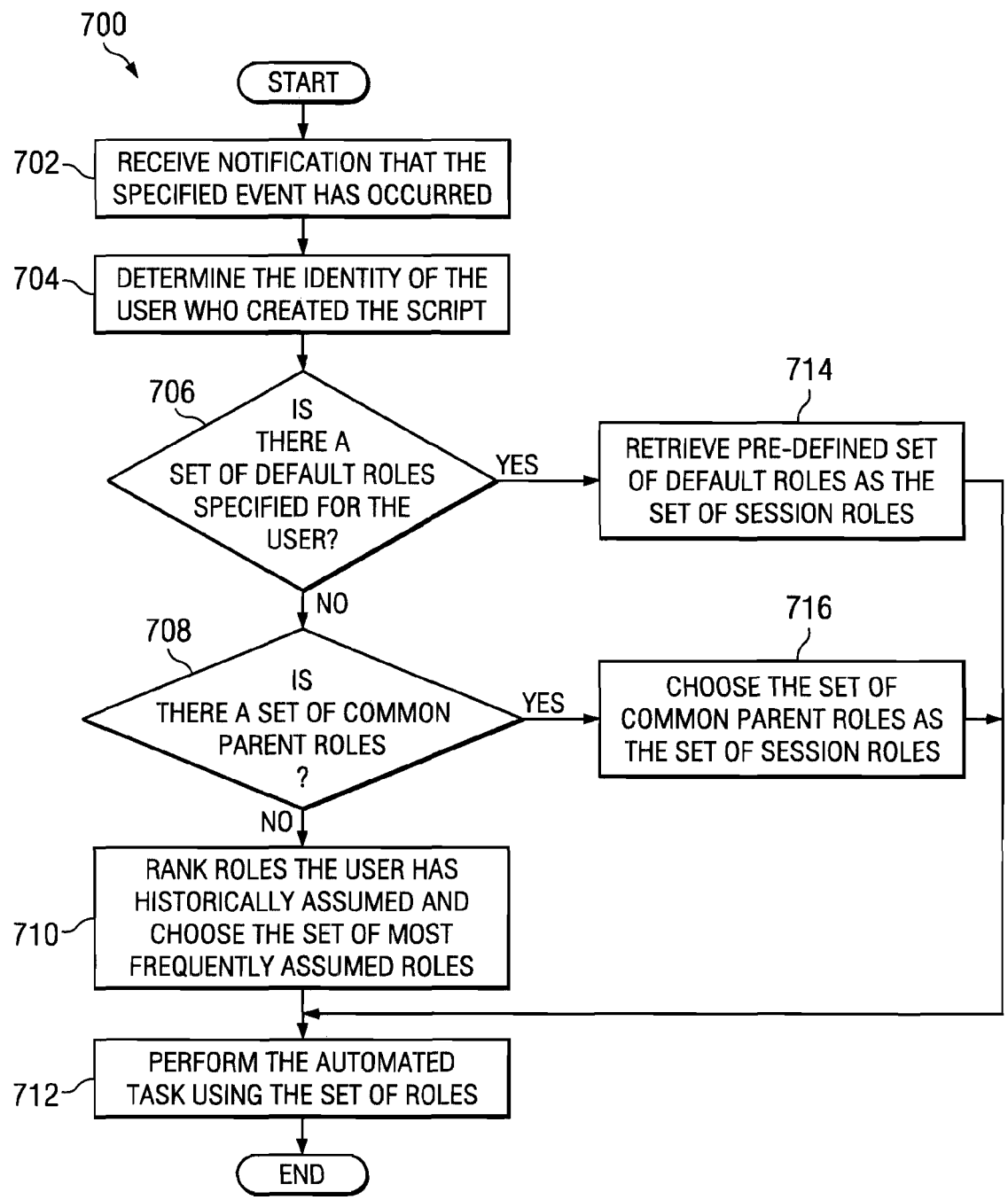
FIG. 7 is a flowchart for determining the roles to assign an automated task using three techniques in accordance with an illustrative embodiment.

FIG. 7 is a flowchart for determining the set of roles when performing an automated task using three techniques in accordance with an illustrative embodiment. The process in FIG. 7 is executed by software, such as thread 120 in FIG. 1. The process begins by receiving notification that the specified event has occurred (step 702). The process identifies the identity of the user who created the automated task (step 704). The process determines whether a default set of roles have been defined for the user (step 706). If the answer is "no" and there is no default set of roles defined for the user, then the process determines whether there is a set of common parent roles (step 708). If the answer is "no" and there is no set of common parent roles, then the process ranks the roles the user has historically assumed and assigns the set of most frequently assumed roles as the set of session roles (step 710). A session is created and the set of session roles are used to perform the automated task in the session (step 712), and the process ends.

If the answer in step 706 is "yes" and the process determines there is a set of default roles, then the predefined set of default roles is retrieved, and assigned as the set of session roles (step 714). A session is created, the set of session roles is used to perform the automated task in the session (step 712), and the process ends.

If the answer in step 708 is "yes" and the process determines there is a set of common parent roles, then the set of common parent roles are chosen as the set of session roles (step 716). A session is created, and the set of session roles are used to perform the automated task (step 712), and the process ends.

Note that step 706, step 708 and step 710 may be interchanged and performed in a different order. For example, the process may first look at the historical assumption of roles by the user, and if the user does not have a history, then the process might look at default roles or common parent roles. Alternately, for example, the process may first look for common parent roles, and if there are no common parent roles, then the process might look at default roles or historically assumed roles. The system administrator may specify which order step 706, step 708 and step 710 are performed.

Thus, the illustrative embodiments described herein provide a computer implemented method, apparatus, and computer program product for performing an automated task in a role-based access control environment. A set of roles is assigned to a user to form assigned roles, wherein the role-based access control environment allows the user to assume a subset of the assigned roles at a given time. Responsive to receiving a request to execute an automated task, an identity of the user creating the automated task is identified. Responsive to determining that the user creating the automated task is not logged in, a set of session roles are identified based on the identity of the user. A session is created for the automated task. The automated task is performed in the session using the set of session roles.

A role-based access control environment often has restrictions, such as how many roles a user can assume at a given time. The illustrated embodiments allow automated tasks to be created and performed in the role-based access control environment even when the user who created the automated tasks is not logged in to specify the roles for the automated task.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for performing an automated task in a role-based access control environment, the computer implemented method comprising:

assigning by one or more processors a set of roles to a user to form assigned roles, wherein the role-based access control environment allows the user to assume a subset of the assigned roles at a given time;

responsive to receiving a request to execute an automated task, identifying by the one or more processors an identity of the user creating the automated task, wherein the step of identifying the set of session roles based on the identity of the user further comprises:

determining a set of most frequently assumed roles for the user by ranking roles the user has historically assumed based on how frequently the user assumed each role; and setting the set of most frequently assumed roles as the set of session roles;

responsive to a determination that the user creating the automated task is not logged in, identifying by the one or more processors a set of session roles based on the identity of the user;

creating by the one or more processors a session for the automated task; and performing by the one or more processors the automated task in the session using the set of session roles.

2. The computer implemented method of claim 1, wherein the step of responsive to receiving a request to execute an automated task, identifying an identity of the user creating the automated task further comprises:

specifying by the one or more processors an event to form a specified event;

responsive to determining that the specified event has occurred, receiving by the one or more processors a request to execute an automated task; and responsive to receiving the request to execute the automated task, identifying by the one or more processors an identity of the user creating the automated task.

3. The computer implemented method of claim 1, wherein the step of identifying the set of session roles based on the identity of the user further comprises:
retrieving by the one or more processors a set of default roles, wherein the set of default roles are previously created; and
setting by the one or more processors the set of default roles as the set of session roles.

4. The computer implemented method of claim 1, wherein the step of identifying the set of session roles based on the identity of the user further comprises:
identifying by the one or more processors a set of parent roles for the set of roles, wherein the parent roles are hierarchically higher than the roles; and
setting the set of parent roles as the set of session roles.

5. The computer implemented method of claim 1, wherein the step of identifying the set of session roles based on the identity of the user further comprises:
performing by the one or more processors at least two of retrieving a set of default roles, determining a set of most frequently assumed roles of the user, and determining a set of parent roles for the set of roles; and
setting one of the set of default roles, set of parent roles, and set of most frequently assumed roles as the set of session roles.

6. The computer implemented method of claim 1, wherein the automated task is one of an application, a command, and a script file containing one or more commands, and wherein the event is one of a user login, and a date and time.

7. A computer program product comprising a computer usable hardware medium including computer usable program code for performing an automated task in a computer having a role-based access control environment, the computer program product comprising:
computer usable code for assigning a set of roles to a user to form assigned roles, wherein the role-based access control environment allows the user to assume a subset of the assigned roles at a given time;
computer usable code for, responsive to receiving a request to execute an automated task, identifying an identity of the user creating the automated task;
responsive to a determination that the user creating the automated task is not logged in, computer usable code for identifying a set of session roles based on the identity of the user, wherein the computer usable code for identifying the set of session roles based on the identity of the user further comprises: computer usable code for determining a set of most frequently assumed roles for the user by ranking roles the user has historically assumed based on how frequently the user assumed each role; and computer usable code for setting the set of most frequently assumed roles as the set of session roles;
computer usable code for creating a session for the automated task; and
computer usable code for performing the automated task in the session using the set of session roles.

8. The computer program product of claim 7, wherein the computer usable code for, responsive to receiving a request to execute an automated task, identifying an identity of the user creating the automated task further comprises:
computer usable code for specifying an event to form a specified event;
computer usable code for, responsive to determining that the specified event has occurred, receiving a request to execute an automated task; and
responsive to receiving the request to execute the automated task, computer usable code for identifying an identity of the user creating the automated task.

9. The computer program product of claim 7, wherein the step of determining the set of session roles based on the identity of the user further comprises:
computer usable code for retrieving a set of default roles, wherein the default roles are previously created; and
computer usable code for setting the set of default roles as the set of session roles.

10. The computer program product of claim 7, wherein the computer usable code for determining the set of session roles based on the identity of the user further comprises:
computer usable code for determining a set of parent roles for the set of roles, wherein the parent roles are hierarchically higher than the roles; and
computer usable code for setting the set of parent roles as the set of session roles.

11. The computer program product of claim 7, wherein the computer usable code for determining the set of session roles based on the identity of the user further comprises:
computer usable code for performing at least two of retrieving a set of default roles, determining a set of most frequently assumed roles of the user, and determining a set of parent roles for the set of roles; and
computer usable code for setting one of the set of default roles, set of parent roles, and set of most frequently assumed roles as the set of session roles.

12. The computer program product of claim 7, wherein the automated task is one of an application, a command, and a script file containing one or more commands, and wherein the event is one of a user login, and a date and time.

13. A data processing system for performing an automated task in a computer having a role-based access control environment, the data processing system comprising:
a bus;
a storage device connected to the bus, wherein the storage device contains computer usable code;
a communications unit connected to the bus; and
a processing unit connected to the bus for executing the computer usable code, wherein the processing unit executes the computer usable code to assign a set of roles to a user to form assigned roles in response to input from an administrator, wherein the role-based access control environment allows the user to assume a subset of the assigned roles at a given time; create the automated task, in response to input from the user, wherein the input specifies the automated task; responsive to receiving a request to execute the automated task, identify an identity of the user who created the automated task; responsive to a determination that the user creating the automated task is not logged in, identify a set of session roles based on the identity of the user, wherein in executing the computer usable program code to identify the set of session roles based on the identity of the user, the processing unit further executes the computer usable program code to identify the set of session roles based on the identity of the user by further executing the computer usable code to determine a set of most frequently assumed roles for the user by ranking roles the user has historically assumed based on how frequently the user assumed each role, and set the set of most frequently assumed roles as the set of session roles; create a session for the automated task; and perform the automated task in the session using the set of session roles.

14. The data processing system of claim 13, wherein the processing unit, responsive to receiving a request to execute the automated task, identify an identity of the user who created the automated task, further executes the computer usable code to specify an event to form a specified event; responsive to determining that the specified event has occurred, receive a request to execute the automated task; and responsive to receiving the request to execute the automated task, identify an identity of the user creating the automated task.

15. The data processing system of claim 13, wherein in executing the computer usable program code to identify the set of session roles based on the identity of the user, the processing unit further executes the executes the computer usable program code to determine the set of session roles based on the identity of the user by further executing the computer usable code to retrieve a set of default roles, wherein the set of default roles are previously created, and sets the set of default roles as the set of session roles.

16. The data processing system of claim 13, wherein in executing the computer usable program code to determine the set of session roles based on the identity of the user, the processing unit further executes the computer usable program code to identify the set of session roles based on the identity of the user by further executing the computer usable code to determine a set of parent roles for the set of roles, wherein the parent roles are hierarchically higher than the roles, and set the set of parent roles as the set of session roles.

17. The data processing system of claim 13, wherein in executing the computer usable program code to identify the set of session roles based on the identity of the user, the processing unit further executes the computer usable program code to identify the set of session roles based on the identity of the user by further executing the computer usable code to perform at least two of retrieves a set of default roles, determines a set of most frequently assumed roles of the user, and determines a set of parent roles for the set of roles, and sets one of the set of default roles, set of parent roles, and set of most frequently assumed roles as the set of session roles.

* * * * *